INVENTOR
WILLIAM R. POSTLEWAITE
ATTORNEYS

INVENTOR
WILLIAM R. POSTLEWAITE
ATTORNEY

United States Patent Office 3,190,461
Patented June 22, 1965

3,190,461
LOAD HANDLING APPARATUS
William R. Postlewaite, Menlo Park, Calif., assignor, by mesne assignments, to John H. Kemp, Jr., Atherton, Calif.
Filed July 16, 1963, Ser. No. 295,367
7 Claims. (Cl. 214—1)

This invention relates to a load handling apparatus and a load handling system and, more particularly to a system and apparatus for transferring a load from a first pallet on which it is received, to a second pallet.

This application is a continuation-in-part of my copending application entitled "Pallet Load Transfer Mechanism," Serial No. 249,032, which was filed January 2, 1963, now Patent No. 3,123,232 issued March 3, 1964, and in which there is described a material handling system including among other things, apparatus for tilting a palletized load of goods onto its side and temporarily supporting it in such position while the pallet is removed and then transferring the load to another pallet. The apparatus and system described in my copending application are particularly useful in warehousing and other operations wherein it is desired to transfer incoming loads of goods from a shipper's pallets to a warehouseman's pallets, so that the shipper's pallets can be returned.

It is an object of the present invention to provide a material handling apparatus and system which accomplish the same result by inverting rather than by merely tilting the loads. Such inverting operation has certain advantages as will appear hereinafter.

In carrying out the objects of this invention I provide a pallet transfer system including a rotatable pallet inverter adapted to receive a palletized load on one pallet support and an empty pallet on another. After the pallet supports are moved to engage the load firmly at both top and bottom, the inverter is rotated through 180° so that the load is transferred to the once-empty pallet.

Figure 1:
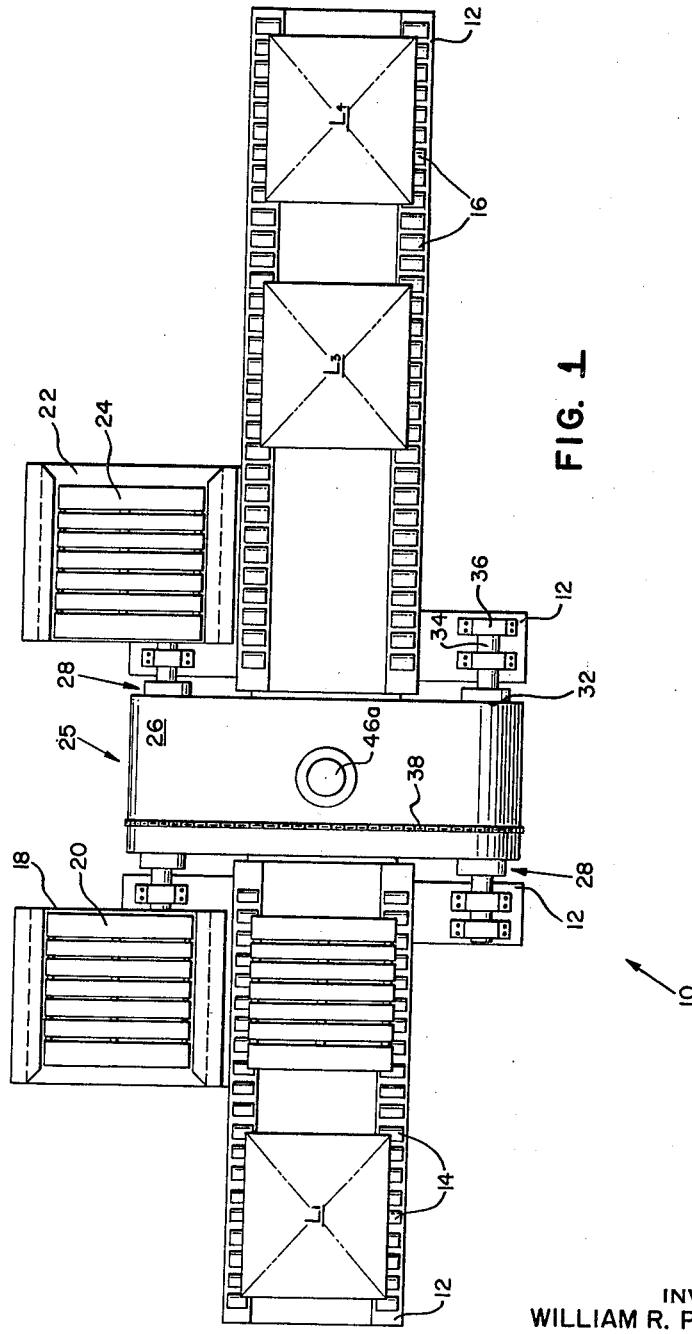
Figure 2:
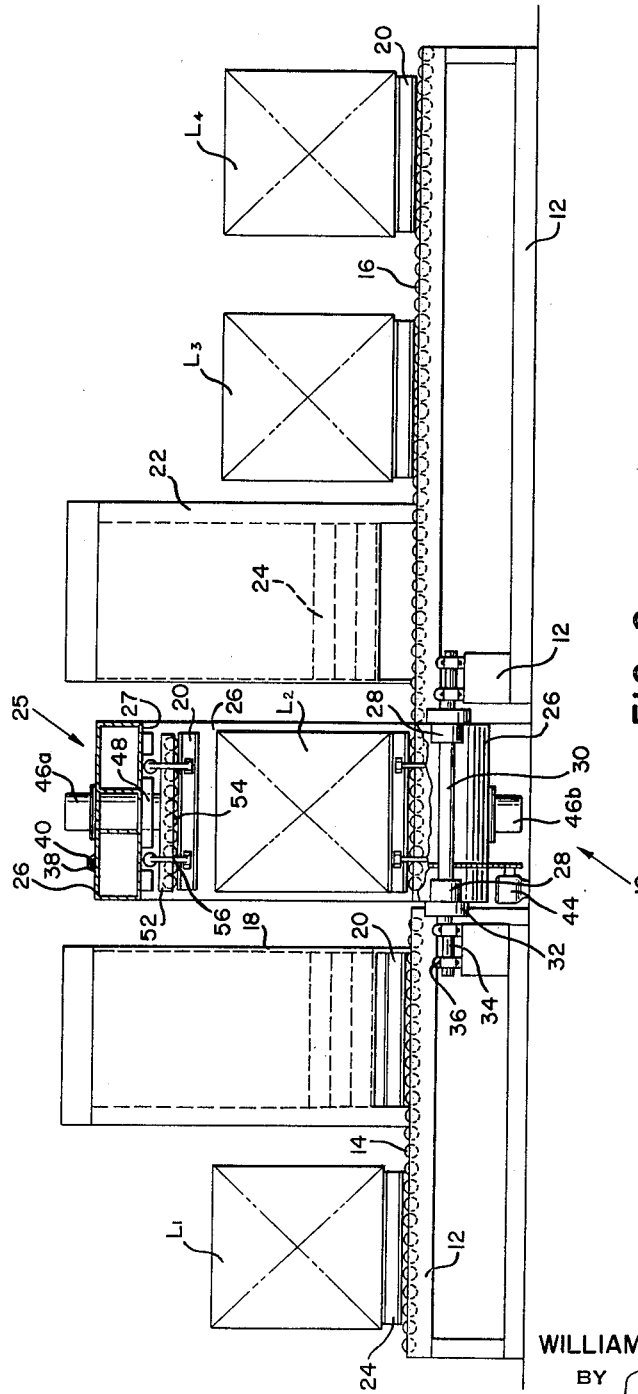

One form of my invention is illustrated by way of example in the accompanying drawings in which:

FIG. 1 is a top-plan view of the apparatus;
FIG. 2 is a view in side elevation showing the pallet inverter in partial section; and
FIG. 3 is a view in end elevation of the pallet inverter assembly.

Referring now to the drawings with greater particularity, the apparatus is generally designated by the reference numeral 10, and comprises a framework 12 which supports a set of inlet conveyor rollers 14 and a set of outlet or exit conveyor rollers 16. These rollers may be power driven or not as desired and the specific structure and operation thereof is not a critical feature of this invention. Adjacent the inlet conveyor 14 there is provided a supply hopper or magazine 18 for replacement pallets 20 that are kept in stock at the warehouse or receiving station, and a second hopper or magazine 22 provided adjacent the delivery conveyor 16 to receive the shipper's pallets 24 for temporary storage and return.

In FIG. 2 there is shown a load $L_1$ of goods supported upon an incoming shipper's pallet 24. It is desired to transfer the load $L_1$ to a warehouseman's pallet 20 and then remove the warehouseman's pallet carrying the load and the empty shipper's pallets from the machine. The palletized load may then be moved for further processing and the shipper's pallet returned to its source e.g., by loading it on the same truck which has brought the merchandise to the warehouse. It also is desired to accomplish this in a continuous manner wherein loads such as shown at $L_1$ are transferred from a set of pallets 24 to a set of warehouseman's pallets 20; the loads on warehouseman's pallets are removed from the assembly, as by means of a fork lift truck; and the emptied shipper's pallets 24 are stacked up in the magazine 22 and are removed from time to time, as by means of fork lift truck, and deposited on the shipper's truck.

Figure 3:
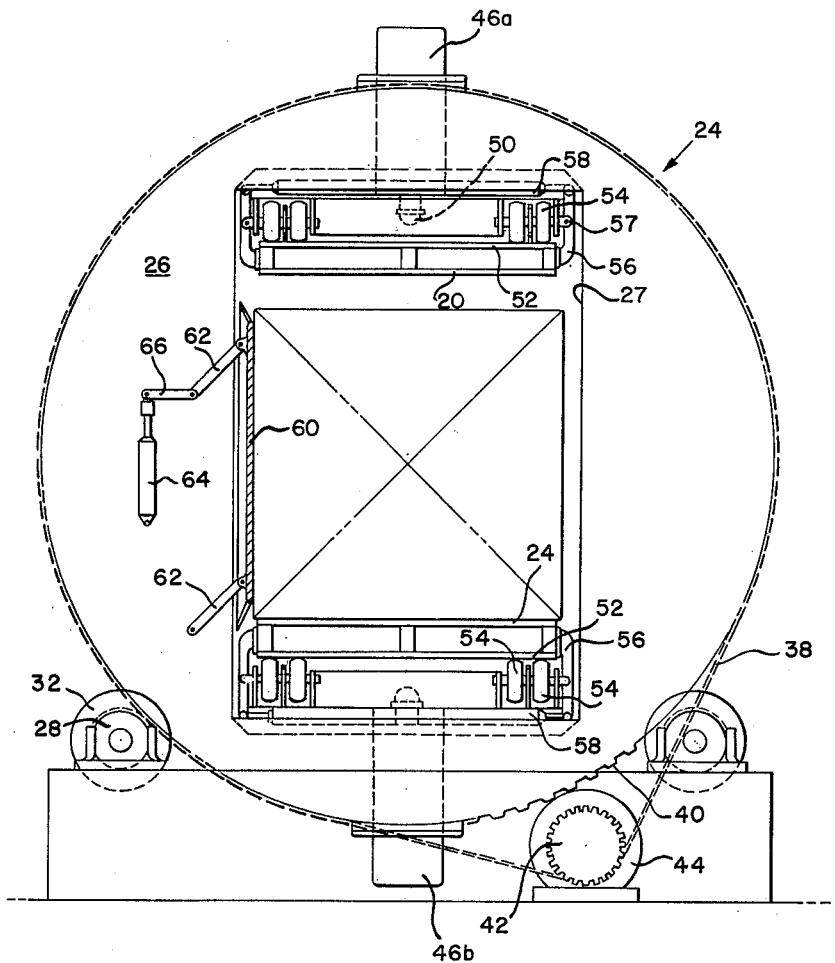

Referring to FIGS. 2 and 3 the inverter mechanism for accomplishing this transfer of pallets is designated generally by the reference numeral 25. The inverter mechanism comprises a circular shell or inverter wheel 26 which is supported by a series of rollers 28 so that it is capable of rotation and which includes an opening or recess 27 for reception of a palletized load in the manner and for the reasons explained hereinafter. The rollers 28 are rotatably carried on shafts 30 and include radial flanges 32 to restrain axial displacement. Shaft extensions 34 are carried in bearing blocks 36 mounted on the frame 12 to support the shafts and are eccentrically carried on the roller shafts 30 so that they may be turned in the bearings to adjust the position of the rotational axis of the rollers 28 and align the inverter wheel recess with respect to the conveyors 14 and 16.

Rotation of the shell 26 is accomplished by any suitable means, as for example by a chain 38 which is wrapped about the shell 26 and engages teeth 40 formed thereon. The chain 38, in turn is driven by a sprocket 42 mounted on a shaft which is rotated by a suitable motor drive 44. Any other suitable means, such as a pinion and ring gear, may be employed for rotating the inverter shell 26 and the chain 38 is shown merely for purposes of illustration.

Affixed to the shell 26 in diametrically opposed relation are two hydraulic rams 46a and 46b, each having a piston rod 48 which is connected by means of a swivel joint 50 (FIG. 3) to a frame 52 which rotatably supports rollers 54. The rollers 54 may be conventional steel rollers, or rubber lined wheels or a combination of both, and they may be power driven or not as desired. It is apparent that each assembly comprising a frame 52 and rollers 54 constitutes a short section of a roller conveyor which can be moved in a vertical direction by means of the respective cylinder 46a and 46b. It will also be noted that the assembly 52, 54 in the bottom position with the hydraulic rams retracted forms a continuation of main roller conveyors 14 and 16. Also affixed to each frame 52 are a plurality of clamp members 56 each pivotally connected at 57 to the respective frame 52 and operated by a hydraulic ram 58 (FIG. 3) pivotally connected to one end thereof. Also, shown in FIG. 3 is a support plate 60 carried on the ends of parallel arms 62 each of which is pivotally connected at its other end to the shell 26. Suitable means such as a pneumatic or hydraulic cylinder 64 is provided to pivot the arms 62 and, through suitable mechanical connection 66, to move the support plate 60 into and out of contact with the load $L_2$ within the opening 27 of the inverter wheel 26 in order to support the load when it is on its die, as will be explained.

In operation, the apparatus as described and illustrated functions as follows:

Referring to FIG. 2, a load $L_1$ on a shipper's pallet 24 is placed on the conveyor 14 at the left so that it may be moved along the conveyor section 14 by any suitable means, for example, automatically by power operation of the rollers 14 or by hand. Previously, a warehouseman's pallet 20 will have been removed, automatically or by hand, from the magazine 18 onto the conveyor section 14 and moved into the inverter 26 onto the rollers 54 occupying the lower position. Thereupon the appropriate cylinders 58 will be operated to move the clamp members 56 inwardly to clamp the pallet 20 in position. The shell 26 will then be rotated 180° to the position shown at the top of the inverter in FIGS. 2 and 3 with the hydraulic ram 46a retracted to leave clearance for the incoming load $L_1$. While the clamp members 56 continue to clamp the warehouseman's pallet 20 in place, the palletized load L₁ on a shipper's pallet 24 is moved into the inverter 26 in the position occupied by load L₂ in FIG. 2, so as to rest on the rollers 54 of the bottom assembly 52. Thus, as illustrated in FIGS. 2 and 3, a load L₂ on a shipper's pallet 24 is in position on the bottom set of rollers 54 and a warehouseman's pallet 20 is gripped by the clamp members 56 and is held in an elevated position above the load L₂ leaving clearance for the load to be so placed.

Next the cylinder 46a (which is that at the top at the instant described) is operated to move its frame 52 and with it the warehouseman's pallet 20 downwardly until the upper pallet 20 is in firm contact with the top of the load L₂, the swivel joint 50 enabling it to accommodate to irregular loads. Also the clamp members 56 associated with the bottom set of rollers 54 will be operated by the cylinders 58 to clamp the shipper's pallet 24. Then, the cylinder 64 is operated to move the support plate 60 to bear against the side of the load L₂ in the position shown in the FIG. 3 wherein it is conditioned to suport the load when it is on its side. The shell 26 is then rotated 180° in counterclockwise direction in FIG. 3 and during such movement the support plate 60 will provide side support for the load L₂, which is also supported by the two pallets 20 and 24 between which it is clamped.

After the load L₂ is inverted, it will be supported on the warehouseman's pallets 20, and the shipper's pallet 24 will be at the top. Then the cylinder 46b may be operated to elevate the shipper's pallet 24 to provide top clearance and after the clamp members 56 clamping the warehouseman's pallet 20 are released, the load L₂ which has been transferred to the warehouseman's pallet 20 may be moved from the inverter wheel 26 onto the conveyor section 16 as illustrated by loads L₃ and L₄. The transferred loads L₃ and L₄ are in position to be picked up, as by means of a fork lift truck and moved to storage or to another vehicle for transportation. Finally, the shell 26 is rotated back through 180° in either direction to restore the now empty shipper's pallet 24 to the bottom position and, after the respective clamp members 56 are released, the now empty shipper's pallet 24 is moved onto the conveyor section 16 and then into the magazine 22. From the magazine 22 the empty pallets 24 can be picked up by a fork lift truck and loaded onto the shipper's truck to be returned to the shipper.

The foregoing description was of a complete cycle which, in most instances is adequate to complete the transfer of a load. However, certain articles such as bottled drinks are not conveniently stacked in an inverted position and it may be desired to re-invert the load to its original position. This may be accomplished very easily by running the load through the machine a second time following the complete operation just described and transferring the load to a second warehouseman's pallet. Such repeat runs are preferably made separately to avoid mingling pallets in the collection hopper 22. That is, it is best to remove all shipper's pallets from the hopper 22 before running previously transferred loads a second time.

It will be understood that many of the operations thus described can be carried out automatically by suitable control circuitry of electric and/or pneumatic and/or of hydraulic character. The cycle just described may be repeated indefinitely in an automatic and continuous manner.

It will, therefore, be apparent that novel and very useful apparatus and system has been provided for transfer of loads of goods from one set of pallets to another set of pallets. While it has been described in connection with a preferred form of apparatus, it is to be understood that modifications and changes therein may be made by those skilled in the art without departing from the spirit and scope of this invention as defined by the claims appended hereto.

Having described my invention I claim:

1. A machine for transferring goods from a first set of pallets to a second set of pallets, comprising:
   an inlet conveyor,
   means alongside and adjacent said inlet conveyor adapted to supply a second set of pallets sequentially to said inlet conveyor,
   and an inverter assembly located to receive pallets from said inlet conveyor,
   said inverter assembly comprising a first pallet support and a second pallet support vertically spaced from and opposing said first support,
   means interconnecting said pallet supports to permit the same to be rotated in unison about a horizontal axis,
   each said pallet support being movable on said interconnecting means in a vertical direction toward and away from each other,
   means for rotating said interconnecting means about said horizontal axis through increments of 180° to bring said first and second pallet supports in sequence to the top and to the bottom of said inverter assembly,
   means for imparting reciprocating motion to each said pallet support in said vertical direction, and
   means associated with each pallet support for clamping the sides of the pallet supported thereby.

2. The machine of claim 1 including
   a support member to provide support for a side of a load which is clamped in the inverter assembly between said pallet supports and is being rotated,
   said support member being movably mounted to move into and out of contact with a side of a load.

3. The machine of claim 2 including
   an exit conveyor section disposed on the opposite side of the said inverter assembly in relation to said inlet conveyor and including also a magazine for reception of emptied pallets,
   said magazine being located adjacent said exit conveyor.

4. A machine for transferring goods from a first pallet to a second pallet comprising
   a frame,
   a pallet inverter rotatably mounted on said frame,
   first and second pallet supports on said inverter vertically spaced from and opposing each other,
   each said pallet support being vertically movable on said inverter,
   means for rotating said inverter about a horizontal axis through increments of 180° to bring said first and second pallet supports in sequence to the top and to the bottom of said inverter,
   means on said inverter for imparting vertical reciprocating motion to each said pallet support, and
   means on said inverter for temporarily securing pallets on said pallet supports.

5. A machine for transferring goods from a first pallet to a second pallet comprising
   a frame,
   a pair of rollers mounted on said frame for free rotation about horizontally spaced axes,
   a cylindrical pallet inverter supported on said rollers,
   a recess in a circular end of said inverter for reception of a palletized load,
   first and second pallet supports in said recess spaced from and opposing each other,
   each of said pallet supports being mounted on said inverter for reciprocal movement toward and away from the other pallet support,
   means on said inverter for imparting said reciprocal movement to each of said pallet supports,
   means for rotating said cylindrical inverter on said rollers between first and second positions wherein said first and second pallet supports, respectively are horizontally disposed at the bottom of said recess and the other support is horizontally disposed at the top of said recess, and clamp means on said inverter for temporarily securing pallets on said pallet supports.

6. The machine defined in claim 5 wherein each of said pallet supports comprises a frame and a plurality of rollers on said frame positioned for rolling support of a pallet.

7. The machine defined in claim 5 including a generally horizontal conveyor for delivering palletized loads to said recess, and means for adjusting the position of said inverter vertically to align the pallet support at the bottom of said recess with said conveyor.

References Cited by the Examiner

UNITED STATES PATENTS

| | | |
|---|---|---|
| 2,520,252 | 8/50 | Mutchler. |
| 2,838,184 | 6/58 | MacCurdy. |
| 2,865,516 | 12/58 | Hedderich. |
| 3,071,258 | 1/63 | Seigh. |
| 3,123,232 | 3/64 | Postlewaite. |

HUGO O. SCHULZ, *Primary Examiner.*